(12) United States Patent
Fleishman et al.

(10) Patent No.: US 10,643,382 B2
(45) Date of Patent: May 5, 2020

(54) APPLICATION OF CONVOLUTIONAL NEURAL NETWORKS TO OBJECT MESHES

(71) Applicant: Intel Corporation, Santa Clara, CA (US)

(72) Inventors: Shahar Fleishman, Hod Hasharon (IL); Mark Kliger, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 15/478,534

(22) Filed: Apr. 4, 2017

(65) Prior Publication Data

US 2018/0286120 A1 Oct. 4, 2018

(51) Int. Cl.
*G06T 17/20* (2006.01)

(52) U.S. Cl.
CPC ............ *G06T 17/20* (2013.01); *G06T 17/205* (2013.01)

(58) Field of Classification Search
CPC ....... G06T 17/00; G06T 17/20; G06T 17/205; G06T 7/162; G06T 11/206; G06T 3/4023; G06T 3/403
See application file for complete search history.

(56) References Cited

U.S. PATENT DOCUMENTS

| | | | |
|---|---|---|---|
| 2016/0196672 A1* | 7/2016 | Chertok | G06T 11/206 382/156 |
| 2018/0211373 A1* | 7/2018 | Stoppa | G06T 7/001 |

OTHER PUBLICATIONS

Defferrard Convolutional Neural Networks on Graphs with Fast Localized Spectral Filtering, 30th Conference on Neural Information Processing Systems (NIPS 2016) (Year: 2016).*
Masci, Geodesic Convolutional Neural Networks on Riemannian Manifolds, CVF 2015 (Year: 2015).*
Mari, Improving the Neural Meshes Algorithm for 3D Surface Reconstruction with Edge Swap Operations, SAC 08 (Year: 2008).*
Goodfellow, Deep Learning book, MIT Press book, 2016 (Year: 2016).*
Xu, Directionally_Convolutional_Networks_ICCV_2017_paper—Xu Oct. 2017 (Year: 2017).*
Seong, Geometric Convolutional Neural Network, Aug. 2017 Cornell (Year: 2017).*
Socher, Convolutional-recursive deep learning for 3D object classification, NIPS'12 Proceedings of the 25th International Conference on Neural Information Processing Systems, vol. 1, pp. 656-664 (Year: 2012).*
Ji, 3D convolutional neural networks for human action recognition, IEEE Transactions on Pattern Analysis and Machine Intelligence (vol. 35, Issue: 1, Jan. 2013), pp. 221-231 (Year: 2013).*

(Continued)

*Primary Examiner* — Phuc N Doan
(74) *Attorney, Agent, or Firm* — Green, Howard, & Mughal LLP

(57) ABSTRACT

Convolutional Neural Networks are applied to object meshes to allow three-dimensional objects to be analyzed. In one example, a method includes performing convolutions on a mesh, wherein the mesh represents a three-dimensional object of an image, the mesh having a plurality of vertices and a plurality of edges between the vertices, performing pooling on the convolutions of an edge of a mesh, and applying fully connected and loss layers to the pooled convolutions to provide metadata about the three-dimensional object.

20 Claims, 10 Drawing Sheets

(56) References Cited

OTHER PUBLICATIONS

Xu, Directionally Convolutional Networks for 3D Shape Segmentation, URL: https://par.nsf.gov/servlets/purl/10058462 , pp. 2698-2707, May 2016 (Year: 2016).*

Jia, Fast Mesh Simplification Algorithm Based on Edge Collapse, 2006, URL: https://link.springer.com/content/pdf/10.1007/978-3-540-37256-1_35.pdf (Year: 2006).*

* cited by examiner

APPLICATION OF CONVOLUTIONAL NEURAL NETWORKS TO OBJECT MESHES

FIELD

The present application relates to convolutional neural networks and in particular to the application of convolutional neural networks to meshes and even irregular meshes representing three-dimensional objects.

BACKGROUND

Perceptual computing and image understanding seek to analyze a scene captured by one or more cameras, identify objects in the scene, and then understand the actions and interactions of the objects. These technologies are being used in robotics, virtual reality, augmented reality, and for many other applications. Inexpensive, small image sensors have allowed for devices and machines to be outfitted with more cameras in more places and for depth cameras to be deployed to determine distances.

Using all of these cameras, computer vision systems seek to reason about natural images. Given an input image, a computer vision system performs a function that outputs some high-level information about the image. For example the system may distinguish objects and backgrounds, identify particular objects in the image, locate the objects in the scene, etc. Convolutional neural networks (CNN) form the basis for a number of successful systems that solve problems like image classification and object localization in images. A CNN is a complex function that works from a space of images to an output that is specific to the task. For example a function from an image to the type of scene that is seen in the image, such as a kitchen, living room, outdoor scene, etc.

Many techniques for perceptual computing and image understanding use a convolutional neural network (CNN) to find patterns, identify objects, track objects as they move, and for other purposes. CNNs for two-dimensional images have been in use for years. When using a three-dimensional image, that is an image that includes distances from the observer or distances between objects, the CNN techniques become more complex.

One approach to a 3D CNN is to analyze renderings of an object from multiple views. In this case, at runtime the object is rendered from multiple views and then a CNN is applied to all of these views. This method requires far more images to be analyzed and still may not be able to combine all of the necessary information that is required in order to make a useful inference about the object. The inferences are limited because the multiple views see the same part of an object but from different points of view and therefore the network must learn to recognize and understand that it is the same object and how to relate the different views.

Another approach is to represent the 3D object in a regular 3D volumetric grid and apply standard 3D convolution and pooling. These techniques are identical to 2D convolution and pooling, but with the additional dimension of depth. This solution uses significant memory and computational resources. For a typical object represented in a grid of $N^3$ cells, there are only $N^2$ non-empty cells.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Convolutional neural networks (CNN) are being used in the computer-vision world to reason about natural images. Functions output high-level information about an image such as image-classification and object localization. Current CNNs provide a complex function from the space of images to a task-specific output. A common 2D CNN is composed from simple functional operators on images, frequently referred to as layers, that are chained together, i.e. applied one after another, to build a complex function, referred to as a network.

Figure 1:
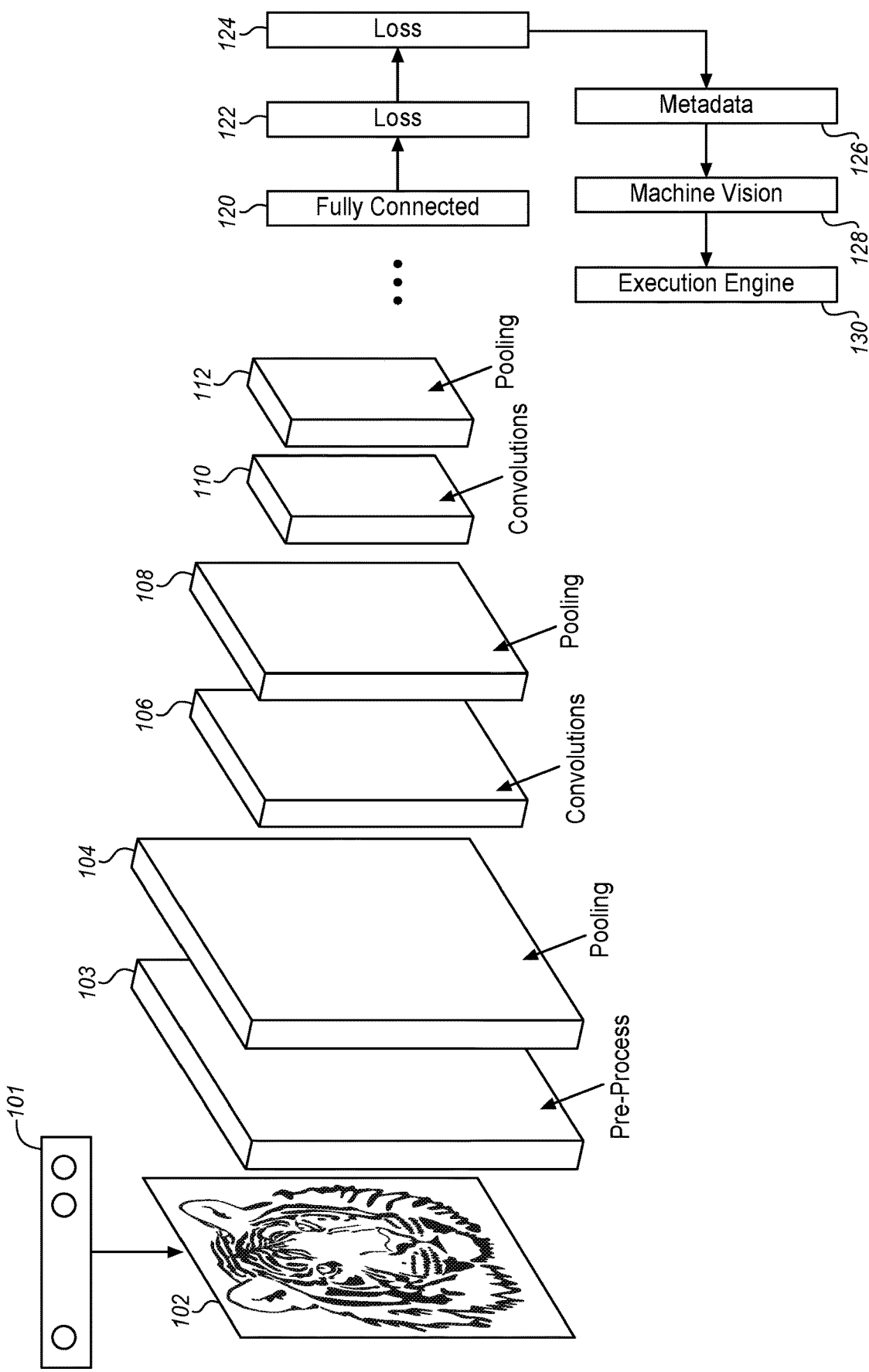
FIG. 1 is a modular block diagram of a convolutional neural network model according to an embodiment.

FIG. 1 is a diagram of an example of such layers to show the operation of a CNN. The process starts with an image 102 or image data. For the 3D (three-dimensional) system described herein, the image includes depth information. The image may be captured by a depth camera system 101 as still or video imagery. Alternatively, the image of images may be taken from storage or received from a remote source. The image may optionally be pre-processed at 103 to a common size, common response range, common scale or for any other type of norming or standardizing. While grids are applied to the image in 2D, as described herein for 3D processing objects are extracted and rendered as meshes in the pre-processing stage. For a 2D image, pooling 104 and convolutions 106 are applied to the image data at a first layer, then pooling 108 and convolutions 110 at a second layer, then pooling 112 and convolutions at additional layers, where the number of layers depends on the design of the network. As described herein, the pooling operations is refined or replaced with a mesh simplification and the convolution is modified to an operation for meshes rather than pixels of a grid. After the convolution layers are completed, then a fully connected layer 120 is applied followed by one or more loss layers 122, 124 that make predictions about the image data.

The CNN uses functional operators that are applied to the original image or to an output of one or more previous layers. There are three common operators: (i) image convolution, (ii) pixel-wise non-linear activation functions (e.g. sigmoid functions, hyperbolic tangent, tanh, functions, ReLU (Rectified Linear Units) functions), and (iii) image resizing operations, also called pooling. The loss layers generate metadata 126 about the images which is consolidated as an output. The metadata is then applied to machine vision 128 which may include any of a variety of different functions, depending on the implementation, such as object identification, object tracking, inspection, classification and other functions. The machine vision interprets the metadata in a way consistent with this intended function. The interpretations are provided as results to an execution engine 130 to act based on the vision results. The action may range from setting a flag to articulating a robot. The components of the figure may all form part of a single machine or computing system or the parts may be distributed into disparate separate components.

Figure 2:
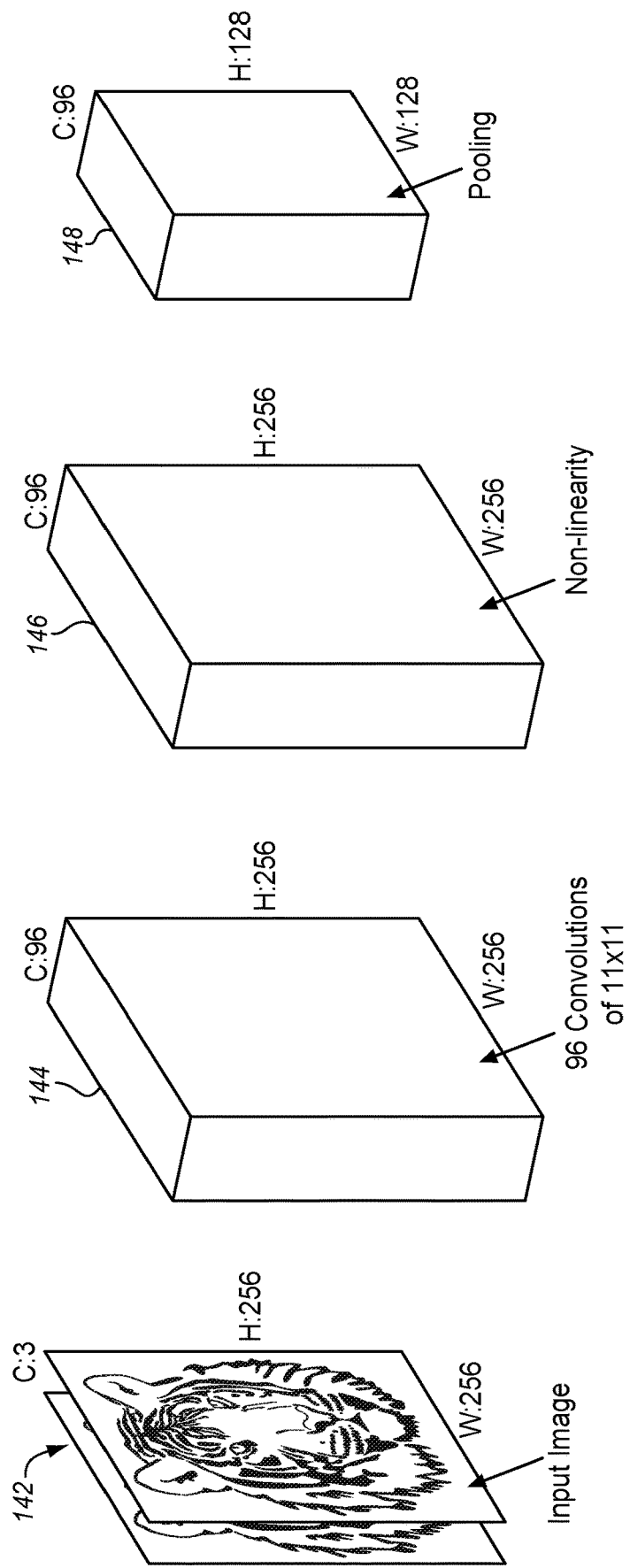
FIG. 2 is a modular block diagram of convolution and pooling in a convolutional neural network model according to an embodiment.

FIG. 2 is a diagram to show a sequence of operations for one convolution and pooling layer of the CNN of FIG. 1. In this example, an incoming image or portion of an image 142 has a particular height and width in pixels and a particular number of colors or channels. In this example, the image is 256 pixels high by 256 pixels wide, with 3 colors or channels for each pixel. In this example, the convolution operation has 96 convolutions of 11×11 pixel blocks to produce a convolution result 144 of 96 channels of the same height and width, 256×256. A non-linearity function is applied to obtain a second result 146 of 96 channels and then pooling is applied. The pooling in this case results 148 in the same 96 channels but with a smaller dimension of 128×128. While 4:1 pooling is used here, any other scale may be used for the pooling. While FIGS. 1 and 2 are presented from a context of a 2D image grid, the same general order or operations may be applied to 3D images as described below.

3D cameras and 3D scanners provide 3D information about the surrounding environment. A 3D image may be presented in any of a variety of different ways. One common representation is as a point-cloud, i.e. a set of data points in a three-dimensional coordinate system (usually X, Y, and Z or Cartesian coordinates). Other representations use cylindrical or polar coordinates, among others. For computer-implemented 3D rendering and modelling, a point-cloud is often converted to a polygon mesh or triangle mesh. The meshes are a collection of vertices, edges and faces which represent a surface of an object or of a collection of objects. Computer hardware and software have been optimized for such mesh models.

Figure 3:
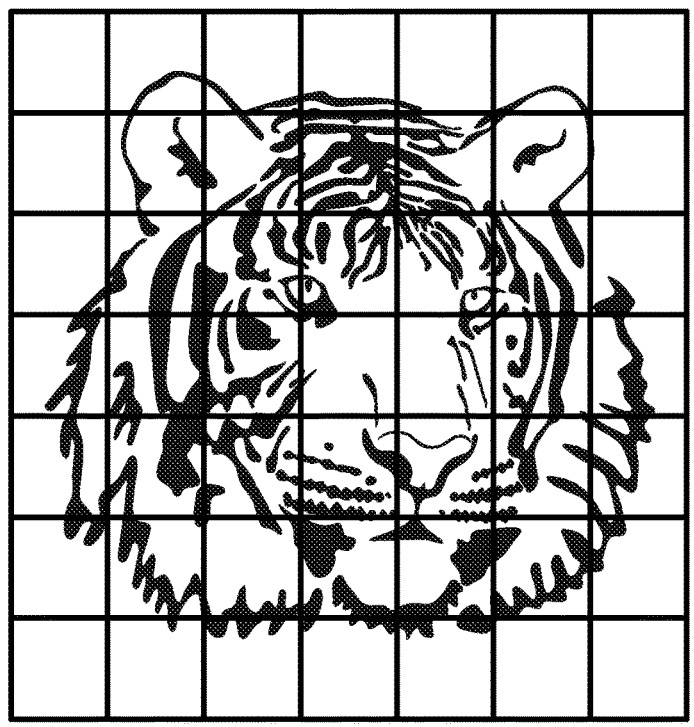
FIG. 3 is a diagram of an image represented by a grid.
Figure 4:
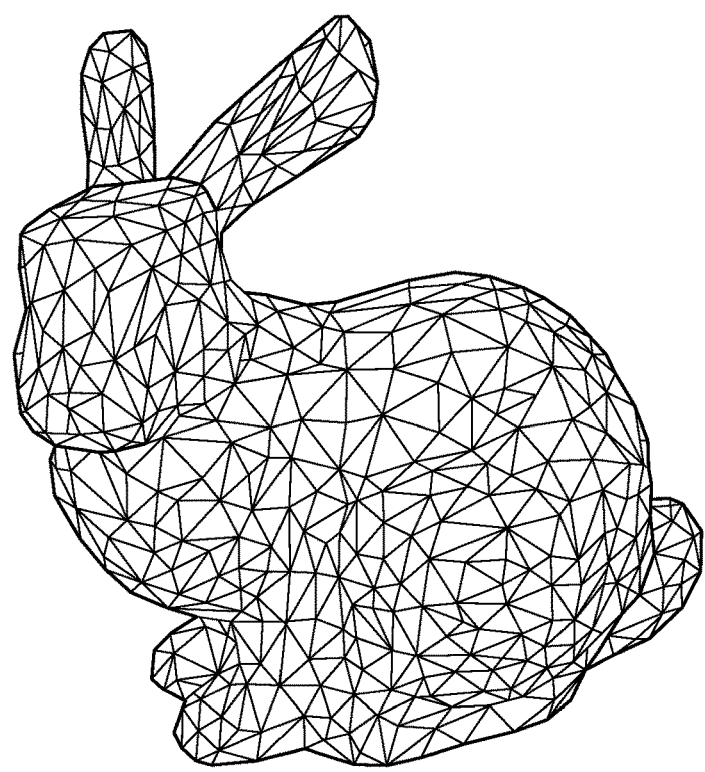
FIG. 4 is a diagram of an image represented by a mesh according to an embodiment.

Convolution and pooling (image resizing) operations, however, do not use meshes but rely on a grid representation and operations are ordered and performed based on the grid. FIG. 3 is a diagram of a regular uniform two-dimensional grid applied to an image. Regular 2D CNNs use this structure in order to compute convolutions and pooling. FIG. 4 is a representation of a mesh structure of representing an image (no image is shown). This structure has vertices and edges. There is no regular grid on a point-cloud or a mesh so that a rectangular grid CNN technique cannot be applied to such a 3D geometry from 3D data.

As described herein, two new operations may be applied to a mesh. These operations allow for specific 3D layers to be created for use with a 3D CNN that operates directly on 3D data. One such operation is a convolution on a mesh which corresponds to a convolution on an image. Another such operation is mesh simplification which corresponds to a pooling-layer in 2D images. With these two operations, many other existing operations, such as the non-linearity and other layers may be applied in the same way as for a 2D CNN.

By defining a convolution operator and a pooling operator for meshes, a CNN that operates directly on meshes is possible. Existing fully connected and loss layers, among others, may be applied after the unique convolution and pooling operations are performed. This makes the CNN more efficient than other types of 3D CNN techniques. Only 3D triangular meshes are described herein, however, the techniques may be extended to other polygons. A 3D mesh may be defined as a pair of sets (V, F), where V is a set of vertices and F is a set of faces. A face is defined by an ordered set of vertices that surround the face. In a 3D triangular mesh, a face is defined by a triplet of vertices.

Figure 5:
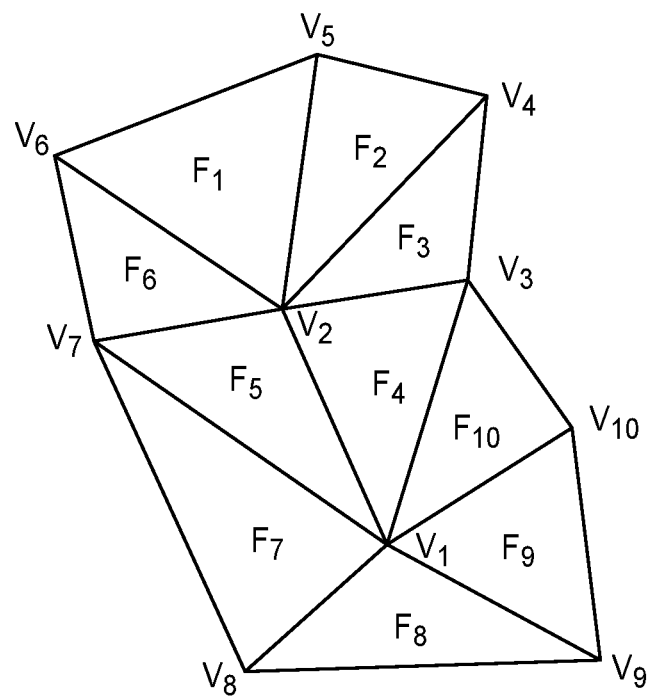
FIG. 5 is a diagram of a portion of a mesh having vertices and faces according to an embodiment.
Figure 6:
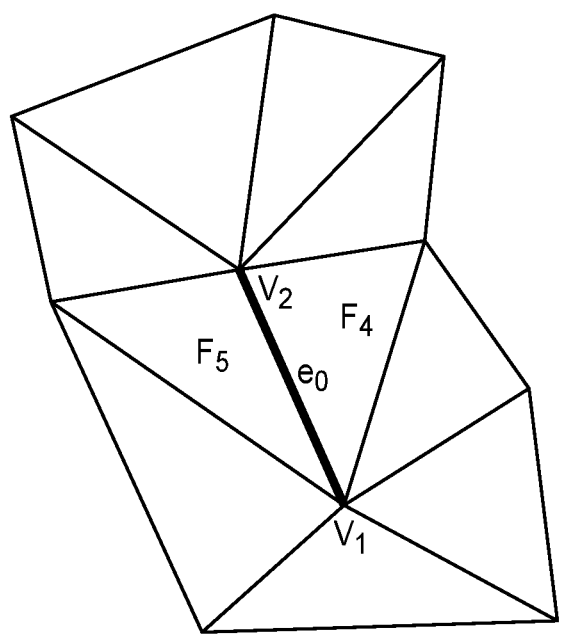
FIG. 6 is a diagram of a portion of a mesh showing the identification of an edge.

FIG. 5 is a diagram of an example of a portion of a mesh with eight different triangular faces labeled F1 to F8. Each face is defined by three vertices labeled v1 to v10. As an example, the first face F1 is defined by the three vertices V1, V5, V6. The second face F2 is defined by the vertices v1, v4, v5. Alternatively, each face for a triangle may be defined by its three edges E or sides. FIG. 6 is a diagram of the same portion of the mesh with many of the labels removed. An edge e0 between two faces F4, F5 is defined by the two vertices (v1, v2) at each end and has no direction. Accordingly, the edge (v1, v2) is the same as the edge (v2, v1).

A first new operation is a mesh convolution. On 2D images, the convolution operator acts on pixels. A 2D convolutional kernel is commonly a small matrix or tensor which multiplies each pixel value and the values of its neighboring pixels by the elements of a convolutional kernel W (weight) and then accumulates the result. Pixel values may be a scalar (e.g. a grey level for a monochrome image) or a vector (e.g. RGB values or values of channels in intermediate layers of a CNN). In other words, a 2D convolution is a weighted sum of the pixel values and its neighbors weighted by the weights W of a kernel.

Figure 7:
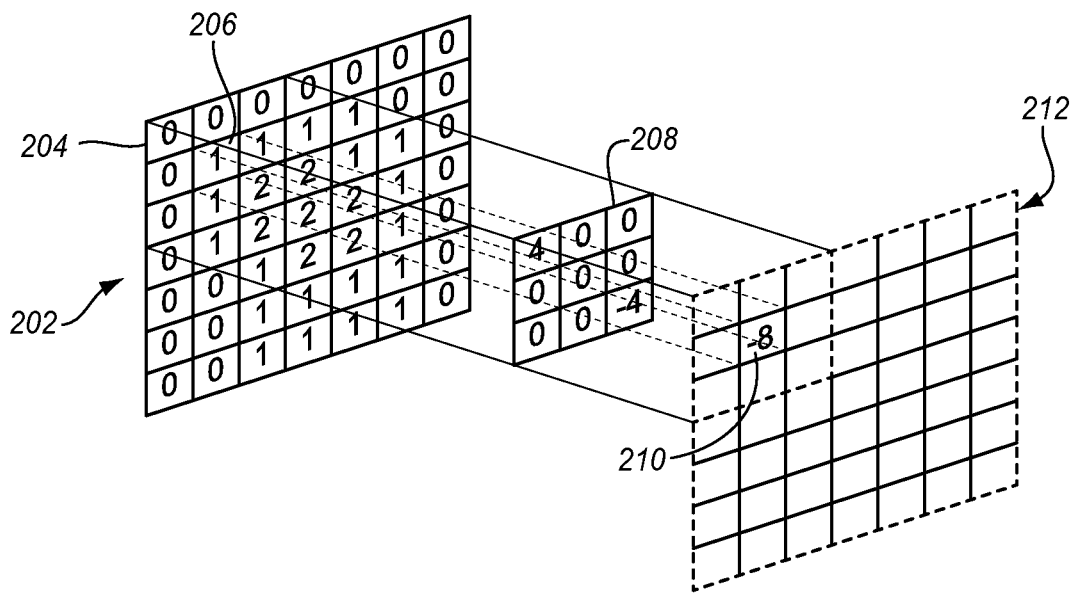
FIG. 7 is a diagram of convolution and pooling using an image grid.

FIG. 7 is a diagram of a convolution operation. A portion of an image grid 202 is at the input end of the convolution. This portion may be of an original input image or an intermediate representation of the image after earlier layers of convolution. A part 204 or subset of the image grid is used for analysis. This subset 204 includes the source pixel 206 and its nearest eight neighbors. These neighbors are only the adjacent pixels in the image. In other implementations, next nearest or other neighbors may also be used.

A convolutional kernel or emboss 208 is applied to each of the pixels of the subset as a set of weights, one for each pixel. In this example, seven of the nine pixels values are multiplied with zero, eliminating those pixels from the result. The top left pixel is multiplied by 4 and the top right is multiplied by −4. This yields 4×0=0 for the top left and −4×2=−8 for the bottom right. These results are accumulated to provide 0+−8=−8 as the convolutional result 210 for the source pixel. The weighting and accumulation are performed for each of the pixels in the input image 202.

Figure 8:
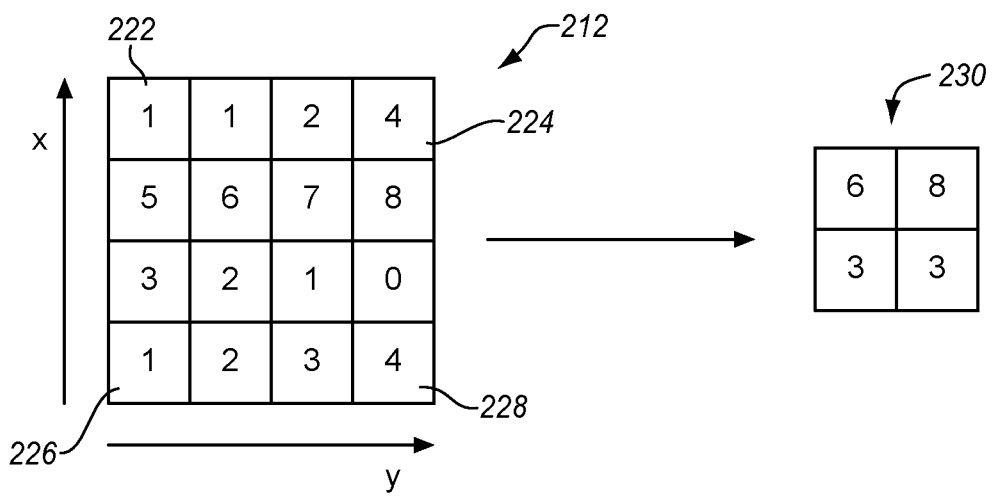
FIG. 8 is a diagram of max pooling using an image grid.

FIG. 8 is a diagram to show an example of pooling with 2×2 filters and a stride of 2. The pooling reduces the resolution or detail of the convolution by a factor of 4, simplifying later operations. The degree of down sampling may be adapted to suit different circumstances. In this example, max pooling is used. In max pooling, the maximum value in each sub-block is taken as the value for a single pixel corresponding to the sub-block. Other types of pooling may alternatively be used depending on the particular implementation. As shown, a portion of the convolutional result 212 is shown as 16 pixel values divided into 4 2×2 sub-blocks 222, 224, 226, 228. The resulting pooled image portion 230 has one pixel for each sub-block which is the maximum value in each sub block. In these examples, the pixel values are limited to a single digit range for illustration purposes, however, implementations are not so limited.

As described herein, a convolution operator on a 3D mesh may operate either on vertices, faces or edges of the mesh. In some embodiments, a convolution operator is described that operates on the set of edges of the mesh. To provide a convolution without pixel values, a response value is assigned to each edge. The response value may be an n-tuple that is analogous to the value of a pixel in an image. The mesh convolution kernel has a fixed size set of edge weights W that is analogous to the weights of a convolution kernel for images. In a manner analogous to that of the image grid, a convolution may be taken as convolving an edge with a mesh convolution kernel as the weighted sum of the response value of the edge and its neighbors weighted by the mesh kernel weights.

The value of the convolution and the reliability of the results are improved by applying some system of ordering to the edges. For a grid, there is an ordering along horizontal and vertical edges. As an example, for a pixel (x,y) a horizontal edge detector is defined as im(x+1,y) and the vertical is defined as im(x,y+1). If vertices are used, then there the edges do not necessarily have a left, right, up, down order. Accordingly, an ordering may be applied to the vertices. In order to provide a consistent order, first, a direction is defined for or assigned to the edge. In some embodiments, the direction may be defined using a set of consistent rules. The mean response of an edge may be used as an example.

First, the mean response near a vertex v is defined as the mean response of edges that are adjacent to the vertex v, r(v)=mean(response(adjacent edges(v))).

Second, the vertices v1 and v2 adjacent to the edge are reordered so that that $\|r(v1)\| <= \|r(v2)\|$, where norm $\|.\|$ is either 1 or p×norm, where p>=0 or $1^{norm}$.

Having defined a direction starting with the vertex with the lowest response as the origin, the neighboring edges are ordered using the direction assigned to the edge.

Figure 9:
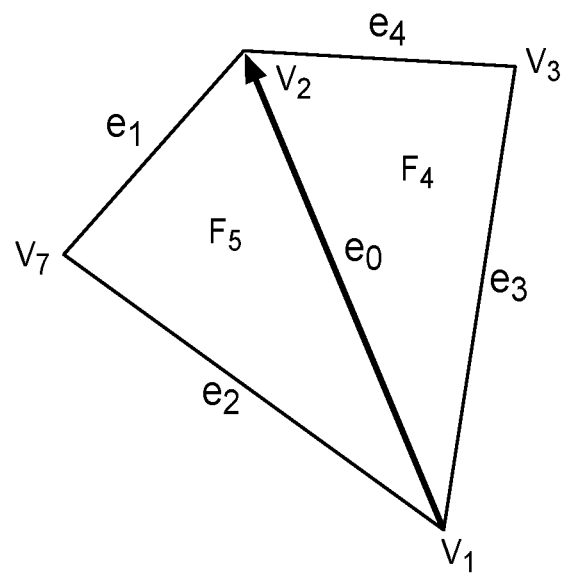
FIG. 9 is a diagram of portion of a mesh showing first order faces surrounding an edge according to an embodiment.

FIG. 9 is a diagram of a portion of the mesh of FIG. 5 showing edge indications. In this example a zeroth edge is to serve analogous to a source pixel and the neighbors are to be found. The zeroth edge e0 extends from v1 to v2. The edge might extend in the other direction based on edge mean responses. In this example, v1 is the vertex with the lowest valued response. The numbering of e0, v1, v2 is for convenience. The ordering may start with a different edge and different vertices depending on the characteristics of the mesh.

To generate the ordering, the zeroth or 0 order neighborhood of an edge e0 is the edge itself. The first or 1st order neighborhood of the edge e0 may be defined as a set of four edges e1, e2, e3, e4 which create two adjacent triangular faces F4, F5 to the edge e0. The order of the edges in the $1^{st}$ order neighborhood of the edge e0 is defined in counter-clockwise order starting from the edge e1 adjacent to vertex v2 in the counter-clockwise direction. This establishes a flow from v1 to v2 and then to e1 counter-clockwise around the four edges, i.e. e1, e2, e3, e4. As can be seen the first order edges all have a vertex, v1 or v2, in common with e0. From another perspective, there is a face F4, F5 adjacent to e0 and either side of e0. The first order edges are the edges that define the two adjacent faces.

Figure 10:
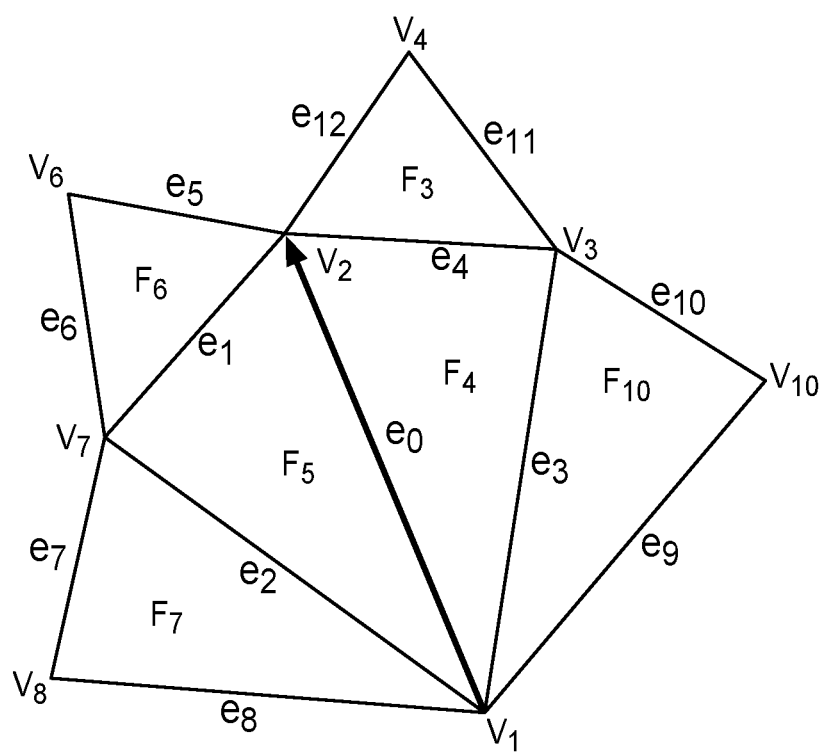
FIG. 10 is a diagram of a portion of a mesh showing first and second order faces surrounding an edge according to an embodiment.

FIG. 10 is a diagram of the mesh showing also second or $2^{nd}$ order neighborhood edges for edge e0. In this example, the $2^{nd}$ order neighborhood is defined as a set of eight edges which create adjacent faces to the edges in the 1st order neighborhood of e0. Since the system uses triangles, the first two faces F4, F5 share one common side, which is the edge e0, and each have two outward facing sides. One face F4 has two outer edges e3, e4. Edge e3 has F4 on one side and F10 on the other side. Similarly, the other edge e4 has F4 on one side and F3 on the other side. The two outer edges of F5 are e1 and e2 which also serve as sides or edges for F6 and F7, respectively. These four additional faces determine the eight additional edges, numbered in this case from e5 to e12. It is also shown that each of these $2^{nd}$ order edges either have a vertex in common with the 0 order edge or with one of the four $1^{st}$ order edges.

The order of the edges in the 2nd order neighborhood of the edge e0 may also be defined in a counter-clockwise order starting from the edge e1. The total number of edges in 1st and 2nd order neighborhoods of edge e0 is 12. In this example, the first four edges are used e1 to e4, then the next eight edges are used in counter-clockwise order from e5 to e12. The particular ordering may be modified, but the system operates better if a consistent order is used throughout the convolutions.

To perform a convolution, a mesh convolution kernel is applied to neighborhoods of an edge. The 0th order convolution kernel is operating on the first edge itself. This is the 0th order neighborhood. It is analogous to a 1×1 2D convolution kernel. For a mesh convolution, the kernel may be defined as an N×M matrix W where N is a cardinality of input response (e.g. 0, 1, 2) and M is a cardinality of an output response. The 1st order convolution operates on an edge itself and its 1st order neighbors. It is analogous to a 3×3 2D convolution kernel. The kernel is a 5×N×M tensor W, where 5 is a number of edges, N is a cardinality of input responses of edges (e0, e1, e2, e3, e4) and M is a cardinality of an output response of the edge e0. The order of weights in the convolution kernel corresponds to the order of neighborhood edges of the edge e0.

Similarly, a second order convolution operates on the same edge, the first order neighbors and the second order neighbors. The kernel is 12×N×M tensor W, where 12 is a number of edges, N and M are a cardinality of an input and output response respectively. It is analogous to a 5×5 2D convolution kernel.

As the mesh is analyzed, the convolution will come to the end or to the border of the mesh. At a border condition an edge does not have a full neighborhood. Nearing the border, some of the second order neighbor edges will not be available on the mesh. As the convolution moves still closer to the border, then one or two of the first order neighbor edges will be missing at the border. The border condition may be solved by adding non-existing edges which complete a neighborhood, but which have zero vector responses.

Pooling allows the size of the convolution result to be reduced for simplicity. For a 2D CNN, image pooling (resizing) layers of 2D CNN uses max pooling or mean pooling operations. In max pooling each fixed-sized (e.g. 2×2) block of pixels of the image is replaced by a single pixel with the maximum value within the block. With mean pooling each fixed size block of pixels is replaced by a single pixel with the mean value of all of the pixels in the block.

Using a 3D mesh, the convolution result may be resized or simplified in a different way. In some embodiments a pooling operation is performed on meshes using mesh simplification methods. In one example, an edge-collapse method may be used to simplify a mesh.

Figure 11:
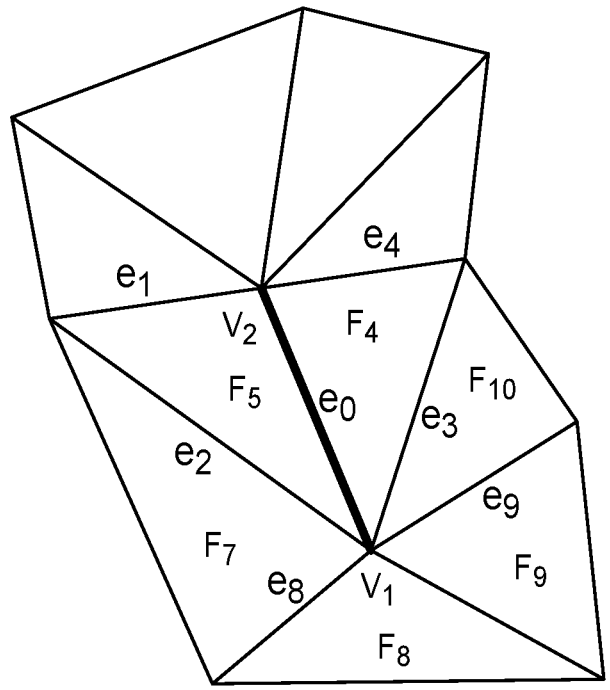
FIG. 11 is a diagram of a portion of a mesh with first order edges before being collapsed according to an embodiment.

FIG. 11 is a diagram of the same section of a mesh as in FIG. 5. The first edge e0 is highlighted. This section of the mesh shows a mesh before edge collapse. In this case edge e0 has been selected for collapse. To initiate an edge collapse, since 3D meshes are not inherently ordered, the edges are first ordered and some of the edges are selected to be collapsed. The number of edges to keep after the pooling phase may be selected to suit any particular application. The choice will depend on accuracy and processing constraints, among others.

In some embodiments, edges are selected randomly for collapse. Some spacing may be used to ensure that the deleted edges are distributed through the mesh. A restriction may be added to collapsing an edge that an edge is not collapsed if a neighboring edge was collapsed. This will roughly distribute the deleted edges over the entire mesh. In other embodiments, edges are selected based on their respective responses. In another embodiment, edges may be sorted based on the amplitude (norm) of their response and are collapsed starting from the one with lowest response amplitude.

Figure 12:
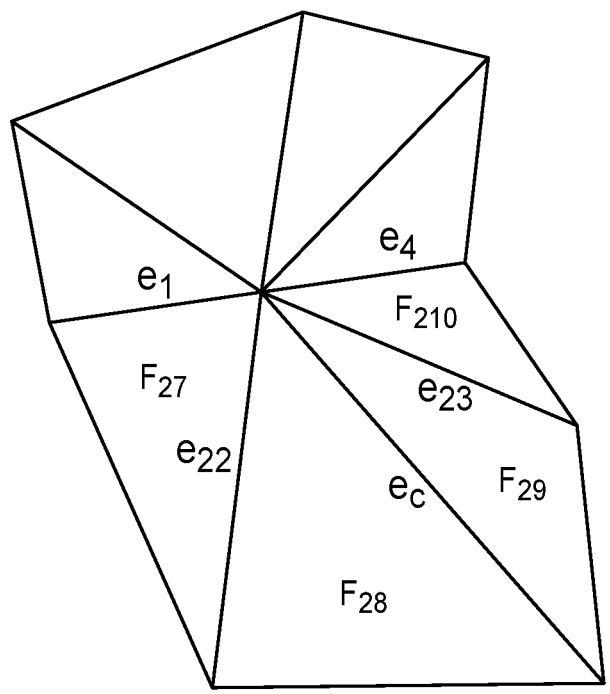
FIG. 12 is a diagram of the portion of the mesh after being collapsed according to an embodiment.

FIG. 12 shows the same portion of the mesh as in FIG. 11 after edge e0 is collapsed. During edge collapse of the edge e0, the collapsed edge e0 and the 4 edges of the 1st order neighborhood of the edge (e1, e2, e8, e9) are replaced by 2 new edges, e22, e23. With the five edges reduced to two, the structure of the mesh is simplified so that later calculations are also accordingly simplified. In the same way, there are six faces (F4, F5, F7, F8, F9, F10) surrounding the edge e0 that are reduced to four faces (F27, F28, F20, F210) that are different from the original six. As shown, the edge e0 is collapsed by moving the source vertex v1 toward the second vertex v2. This is collapsing toward the direction that was determined with respect to FIG. 6. Collapsing may be done in any direction, but applying results consistently through a convolution layer may provide better results.

While directions are shown and described with respect to the mesh diagrams, a direction per se only exists to the extent that vertices have coordinates in space. In some embodiments, coordinates are used only to initialize the responses of the edges. After the responses are initialized, then coordinates are not used. In the diagrams, the coordinates are used to help visualize the process. There are also many other ways to simplify a mesh. The particular approach may be adapted to suit a particular implementation.

After collapsing an edge, pooling is applied to derive a value for the new edges based on the response of the original edges. This may be done in a variety of different ways. In some embodiments, pooling is done by applying a function to the edges that were collapsed into the new edge. As an example, the new edge e22 is related to the three prior edges (e0, e2, e8) that share a common vertex v1. A pooled response for the new edge may be determined as a channel-wise max or mean of the responses of these three edges. Similarly, a pooled response for the other new edge e23 may be taken as a max or mean of the three prior edges (e0, e3, e9) that were collapsed into the new edge. This allows an analogy to max pooling or mean pooling to be applied to a mesh network. Other functions may be used instead of max and mean.

Figure 13:
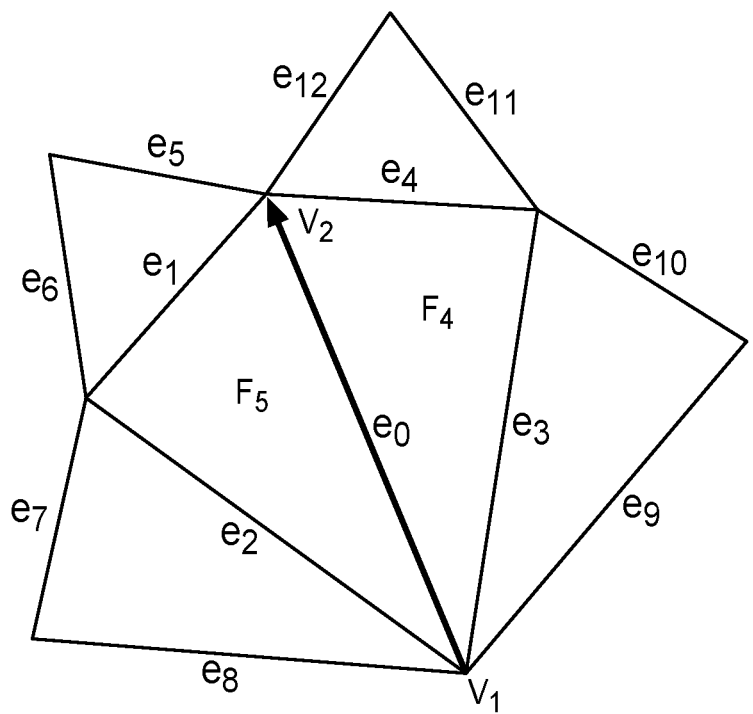
FIG. 13 is a diagram of a portion of a mesh with first and second order mesh edges before being collapsed according to an embodiment.
Figure 14:
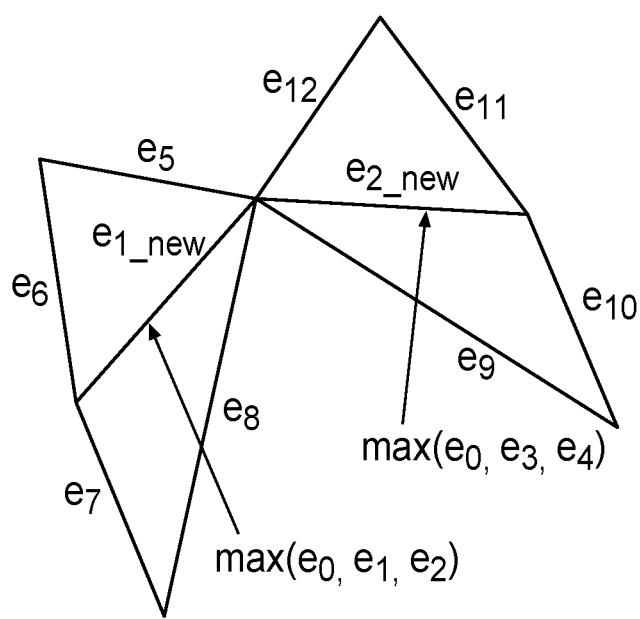
FIG. 14 is a diagram of the portion of the mesh with first and second order mesh edges after being collapsed according to an embodiment.

FIG. 13 is a diagram of first and second order edges of a mesh as in FIG. 10 to show another example of collapsing an edge e0. In this example, the edges e1, e2 of the adjacent face F5 on the left and the edges e3, e4, of the adjacent face F4 on the right are collapsed into a new edge on the left e1_new and the right e2_new. The collapsed portion of the mesh with the new edges is shown in FIG. 14. Max-pooling or mean-pooling may be done be setting the response of the left side new edge e1_new as a channel-wise max or mean of responses of the edges e0, e1, e2 that were collapsed into it, and the response of the left side new edge e2_new as a channel-wise max or mean of responses of the edges e0, e3, e4 that were collapsed into it.

The results of a convolution and pooling on a mesh may be improved by applying transformations on a mesh before the CNN operations. Any 3D object can be represented in several different ways by different meshes. As an example, a cube may be represented by twelve triangles, each having a similar size or by more triangles. Each representation with more triangles defines the same shape but has a completely different structure of triangles. These variations, in which the same object may be represented in different ways, may cause a CNN to interpret the same object as different objects or as different versions of the same object.

The performance of the CNN may be improved for different representations of objects by making the representations more uniform. Any of a variety of different transformations may be applied to a mesh before the convolutions to transform the input mesh objects into more approximately uniform representations.

In some embodiments, a sequence of three operations is applied to each mesh. These are translating the origin, scaling the mesh, and re-meshing. Not all of these operations are necessary and the particular operations and how they are applied may vary based on the nature of the input mesh.

A first operation is to translate the mesh so that the origin of the object represented by the mesh is at the center of mass of the mesh.

A second operation is to scale the mesh so that its largest bounding-box edge has a dimension similar to the bounding box edges of other input mesh objects. Conforming this edge to some standard provides more accurate comparisons in the CNN in some cases. The size of the largest bounding box edge may be selected depending on the particular implementation. In some cases, the edge has a span in the range of [−1,1].

A third operation is to re-mesh the mesh. This may be done, for example, by applying a Poisson sampling of points on the surface of the object and then re-meshing it based on the sampling results. The number of vertices of the new mesh may be predefined and fixed. An analogous operation is performed with 2D image grids to make the grids all conform to a fixed input image size, e.g. fixed height and width in pixels.

A fourth operation is to establish response vectors to edges of the mesh. There are different techniques to establish response vectors. In one example, the response vector of an edge is initialized by assigning a number of hand-crafted features to the edge. Different features may be used depending on the particular implementation. Some alternatives are shown in the drawing figures.

Figure 15:
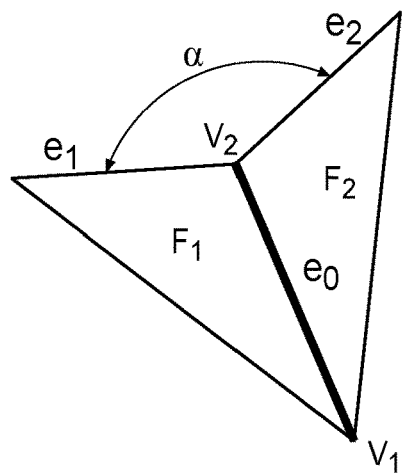
FIG. 15 is a diagram of a dihedral angle of a portion of a mesh according to an embodiment.

FIG. 15 shows an edge e0 between two adjacent faces F1, F2. The edge is between first and second vertices v1, v2. There are two edges e1, e2 that meet at a vertex v2 at one end of the edge. In this example, the response feature may be taken as the angle α of the vertex v2 or the angle between the two connected edges e1, e2. This is also known as the dihedral angle α between the two adjacent faces F1, F2.

Figure 16:
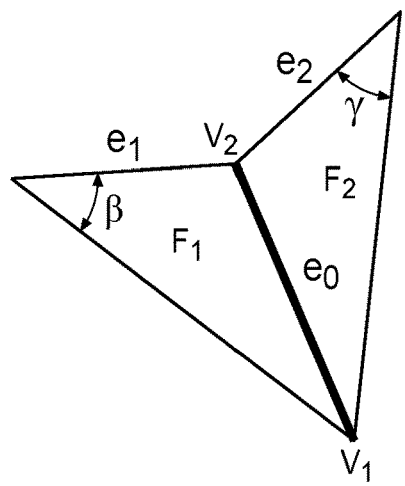
FIG. 16 is a diagram of opposite angles of a portion of a mesh according to an embodiment.

FIG. 16 shows another example, in which the angles β, γ in the faces opposite the edge e0 are used as the response feature. The two values may be averaged, maxed or combined in any other desired manner.

Figure 17:
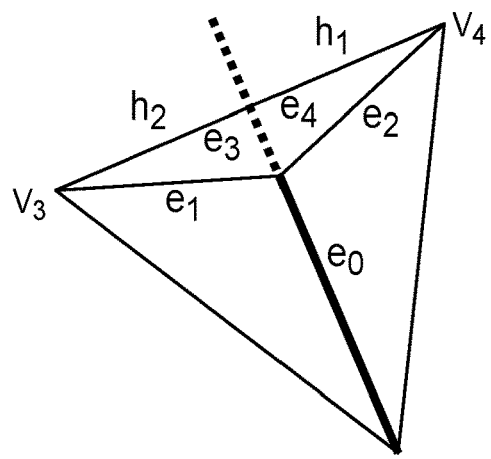
FIG. 17 is a diagram of normalized heights of a portion of a mesh according to an embodiment.

FIG. 17 shows another example, in which the relative heights h1, h2 of the vertices v3, v4 opposite from the edge e0 is used as the response feature. This may be represented as (h1/‖e3‖, h2/‖e4‖). These three examples offer some choices of features that are easily determined for a mesh of triangles, however, other features may be used. The particular best choice of feature may be adapted to suit a specific application.

With the operators for 3D convolution on a mesh and for 3D pooling on a mesh, these operators may be used to build and train a 3D-CNN for object meshes. A 3D-CNN on meshes can solve various computer vision tasks such as 3D object recognition and 3D object retrieval. The problem of 3D object recognition can be solved using a multiclass classification framework. The problem of fine grained 3D object retrieval can be solved using CNN based metric learning by learning a sensible metric between meshes.

Figure 18:
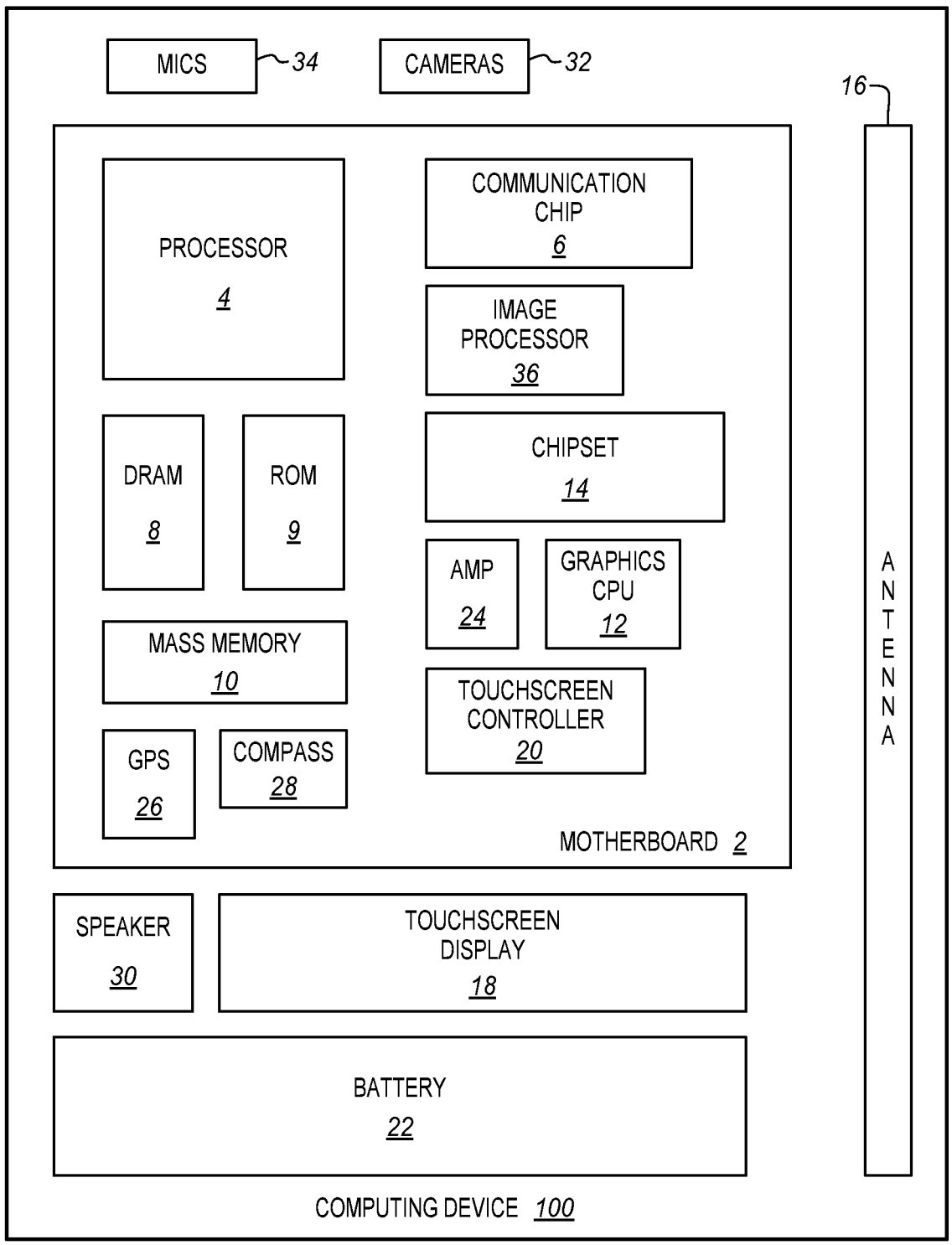
FIG. 18 is a block diagram of a computing device incorporating a three dimension convolutional neural network according to an embodiment.

FIG. 18 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 including any depth sensors or proximity sensor are coupled to an optional image processor 36 to perform conversions, analysis, noise reduction, comparisons, depth or distance analysis, CNN-based image understanding and other processes as described herein. Similarly, the microphones 34 may be coupled to audio processors, digital signal processors (not shown) or the main processor 4 for CNN-based audio processing. The processor 4 is coupled to the image processor to drive the process with interrupts, set parameters, and control operations of the image processor and the cameras. Image processing may instead be performed, in whole or in part, in the processor 4, the graphics CPU 12, the cameras 32 or in any other device. The classified images or audio may be used by the processor as a command interface, for image understanding, or other purposes. The images or audio may also be received from a remote source through the communications chip or retrieved from mass memory, depending on the implementation.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes performing convolutions on a mesh, wherein the mesh represents a three-dimensional object of an image, the mesh having a plurality of vertices and a plurality of edges between the vertices, performing pooling on the convolutions of an edge of a mesh, and applying fully connected and loss layers to the pooled convolutions to provide metadata about the three-dimensional object.

In further embodiments performing convolutions comprises selecting an edge of the mesh, selecting a direction of the edge and convoluting the edge and neighboring edges of the selected edge.

In further embodiments convoluting the edge and neighboring edges comprises assigning a response value to the selected and neighboring edges and convoluting the response values.

In further embodiments assigning a response value comprises an n-tuple that is related to a pixel value at the location of the edge of the object.

In further embodiments selecting a direction of the edge comprises determining a first mean response for edges that are adjacent to a first vertex at a first end of the edge and determining a second mean response for edges that are adjacent to a second vertex at a second end of the edge, comparing the first and the second mean response and selecting a direction of the edge based on the comparison.

In further embodiments the neighboring edges comprise edges that have a vertex in common with the edge.

In further embodiments performing pooling comprises collapsing an edge into other edges of the mesh to form a new edge and determining a response for the new edge based on the responses of the collapsed edge and the edges that the edge was collapsed into.

In further embodiments the other edges of the mesh comprise edges that share a vertex in common with the collapsed edge.

In further embodiments collapsing comprises collapsing an edge that is not adjacent to an edge that was collapsed in an immediately previous iteration.

Further embodiments include applying transformations to the mesh before performing convolutions on the mesh.

In further embodiments the transformations comprise translating, scaling the mesh, and re-meshing.

In further embodiments re-meshing comprises applying a sampling of points on the surface of the object represented by the mesh and then re-meshing the object based on the sampling results.

Further embodiments include applying the metadata to a computer vision system for three-dimensional object recognition.

Some embodiments pertain to a non-transitory machine-readable medium having instructions thereon that when operated on by the machine cause the machine to perform operations that includes performing convolutions on a mesh, wherein the mesh represents a three-dimensional object of an image, the mesh having a plurality of vertices and a plurality of edges between the vertices, performing pooling on the convolutions of an edge of the mesh, and applying fully connected and loss layers to the pooled convolutions to provide metadata about the three-dimensional object.

In further embodiments performing convolutions comprises selecting an edge of the mesh, selecting a direction of the edge and convoluting the edge and neighboring edges of the selected edge.

In further embodiments selecting a direction of the edge comprises determining a first mean response for edges that are adjacent to a first vertex at a first end of the edge and determining a second mean response for edges that are adjacent to a second vertex at a second end of the edge, comparing the first and the second mean response and selecting a direction of the edge based on the comparison.

In further embodiments performing pooling comprises collapsing an edge into other edges of the mesh to form a new edge and determining a response for the new edge based on the responses of the collapsed edge and the edges that the edge was collapsed into.

Some embodiments pertain to a computing system that includes a memory to store a plurality of three-dimensional image objects as meshes for a convolutional neural network, each mesh having a plurality of vertices and a plurality of edges between the vertices, a processor to perform convolutions on a mesh, to perform pooling on the convolutions of an edge of the mesh, and to apply fully connected and loss layers to the pooled convolutions to provide metadata about the three-dimensional object, and machine vision to interpret the metadata.

In further embodiments performing pooling comprises collapsing an edge into other edges of the mesh to form a new edge and determining a response for the new edge based on the responses of the collapsed edge and the edges that the edge was collapsed into.

In further embodiments the processor further applies transformations to the mesh before performing convolutions on the mesh by translating, scaling the mesh, and re-meshing.

What is claimed is:

1. A method comprising:
   determining a response value for each of a plurality of edges of a mesh representative of a three-dimensional (3D) object, wherein the mesh comprises a plurality of vertices and the plurality of edges between the vertices, and wherein a first response value for a first edge of the plurality of edges comprises one of a first angle between second and third edges of the mesh that meet at a first vertex of the first edge, a second angle between the second edge and a fourth edge extending from a second vertex of the first edge to a third vertex of the second edge, or a relative height of the third vertex orthogonally from the first edge;

performing one or more convolutions on the mesh including applying, for each of the plurality of edges, a convolutional kernel to a plurality of first order response values corresponding to each edge, wherein a first plurality of the first order response values for the first edge comprises the first response value followed by a second plurality of response values each corresponding to an edge extending from the first vertex or the second vertex;
performing one or more edge collapse operations after corresponding ones of the convolutions on the mesh; and
applying fully connected and loss layers to provide metadata corresponding to the 3D object.

2. The method of claim 1, wherein the first plurality of the first order response values is in an order of the first response value, followed by a second response value corresponding to the third edge, followed by a third response value corresponding to a fifth edge of the plurality of edges extending from the second vertex to a fourth vertex of the third edge, followed by a fourth response value corresponding to the fourth edge, followed by a fifth response value corresponding to the second edge in response to a first mean response of the first vertex being greater than a second mean response of the second vertex.

3. The method of claim 1, wherein performing the convolutions comprises applying, for each edge of the plurality of edges, a second convolutional kernel to a second order plurality of response values corresponding to each edge, wherein a first plurality of the second order plurality of response values for the first edge comprises the first response value followed by the second plurality of response values and followed by a third plurality of response values for each second edge extending from vertices corresponding to each edge extending from the first vertex or the second vertex.

4. The method of claim 3, wherein performing the convolutions comprises applying, for each edge of the plurality of edges, a third convolutional kernel only to each response value corresponding to each edge.

5. The method of claim 1, wherein performing the one or more edge collapse operations comprises:
collapsing the first edge to the first vertex to form a new edge and to eliminate the fourth edge; and
determining a new response value for the new edge based at least in part on a first order response value corresponding to the fourth edge.

6. The method of claim 5, wherein the collapsing further eliminates a fifth edge of the plurality of edges extending from the second vertex to a fourth vertex of the third edge and wherein determining the new response value is based on a maximum or a median of the first order response value corresponding to the fourth edge and a first order response value corresponding to the fourth edge.

7. The method of claim 5, wherein applying the convolutional kernel comprises multiplying each of a plurality of weights of the convolutional kernel with a corresponding one of the first response value or one of the second plurality of response values.

8. The method of claim 1, further comprising:
applying one or more transformations to the mesh before performing said one or more convolutions on the mesh, wherein the one or more transformations comprise one or more of translating the mesh, a scaling of the mesh, or a re-meshing of the mesh.

9. The method of claim 1, further comprising applying the metadata to a computer vision system for 3D object recognition.

10. A non-transitory machine-readable medium having instructions thereon that when operated on by the machine cause the machine to perform operations comprising:
determining a response value for each of a plurality of edges of a mesh representative of a three-dimensional (3D) object, wherein the mesh comprises a plurality of vertices and the plurality of edges between the vertices, and wherein a first response value for a first edge of the plurality of edges comprises one of a first angle between second and third edges of the mesh that meet at a first vertex of the first edge, a second angle between the second edge and a fourth edge extending from a second vertex of the first edge to a third vertex of the second edge, or a relative height of the third vertex orthogonally from the first edge;
performing one or more convolutions on the mesh including applying, for each of the plurality of edges, a convolutional kernel to a plurality of first order response values corresponding to each edge, wherein a first plurality of the first order response values for the first edge comprises the first response value followed by a second plurality of response values each corresponding to an edge extending from the first vertex or the second vertex;
performing one or more edge collapse operations after corresponding ones of the convolutions on the mesh; and
applying fully connected and loss layers to provide metadata corresponding to the 3D object.

11. The non-transitory machine-readable medium of claim 10, wherein the first plurality of the first order response values is in an order of the first response value, followed by a second response value corresponding to the third edge, followed by a third response value corresponding to a fifth edge of the plurality of edges extending from the second vertex to a fourth vertex of the third edge, followed by a fourth response value corresponding to the fourth edge, followed by a fifth response value corresponding to the second edge in response to a first mean response of the first vertex being greater than a second mean response of the second vertex.

12. The non-transitory machine-readable medium of claim 10, wherein performing the convolutions comprises applying, for each edge of the plurality of edges, a second convolutional kernel to a second order plurality of response values corresponding to each edge, wherein a first plurality of the second order plurality of response values for the first edge comprises the first response value followed by the second plurality of response values and followed by a third plurality of response values for each second edge extending from vertices corresponding to each edge extending from the first vertex or the second vertex.

13. The non-transitory machine-readable medium of claim 12, wherein performing the convolutions comprises applying, for each edge of the plurality of edges, a third convolutional kernel only to each response value corresponding to each edge.

14. A computing system comprising:
a memory to store a mesh representative of a three-dimensional (3D) object, wherein the mesh comprises a plurality of vertices and the plurality of edges between the vertices;

a processor coupled to the memory, the processor to:
  determine a response value for each of the plurality of edges, wherein a first response value for a first edge of the plurality of edges comprises one of a first angle between second and third edges of the mesh that meet at a first vertex of the first edge, a second angle between the second edge and a fourth edge extending from a second vertex of the first edge to a third vertex of the second edge, or a relative height of the third vertex orthogonally from the first edge;
  perform one or more convolutions on the mesh including the processor to apply, for each of the plurality of edges, a convolutional kernel to a plurality of first order response values corresponding to each edge, wherein a first plurality of the first order response values for the first edge comprises the first response value followed by a second plurality of response values each corresponding to an edge extending from the first vertex or the second vertex;
  perform one or more edge collapse operations after corresponding ones of the convolutions on the mesh; and
  apply fully connected and loss layers to provide metadata corresponding to the 3D object.

15. The system of claim 14, wherein the first plurality of the first order response values is in an order of the first response value, followed by a second response value corresponding to the third edge, followed by a third response value corresponding to a fifth edge of the plurality of edges extending from the second vertex to a fourth vertex of the third edge, followed by a fourth response value corresponding to the fourth edge, followed by a fifth response value corresponding to the second edge in response to a first mean response of the first vertex being greater than a second mean response of the second vertex.

16. The system of claim 14, wherein the processor to perform the convolutions comprises the processor to apply, for each edge of the plurality of edges, a second convolutional kernel to a second order plurality of response values corresponding to each edge, wherein a first plurality of the second order plurality of response values for the first edge comprises the first response value followed by the second plurality of response values and followed by a third plurality of response values for each second edge extending from vertices corresponding to each edge extending from the first vertex or the second vertex.

17. The system of claim 14, wherein the processor to perform the convolutions comprises the processor to apply, for each edge of the plurality of edges, a third convolutional kernel only to each response value corresponding to each edge.

18. The system of claim 14, wherein the processor to perform the one or more edge collapse operations comprises the processor to:
  collapse the first edge to the first vertex to form a new edge and to eliminate the fourth edge, and
  determine a new response value for the new edge based at least in part on a first order response value corresponding to the fourth edge.

19. The system of claim 18, wherein the processor to collapse further eliminates a fifth edge of the plurality of edges extending from the second vertex to a fourth vertex of the third edge and wherein the processor to determine the new response value is based on a maximum or a median of the first order response value corresponding to the fourth edge and a first order response value corresponding to the fourth edge.

20. The non-transitory machine-readable medium of claim 10, wherein performing the one or more edge collapse operations comprises:
  collapsing the first edge to the first vertex to form a new edge and to eliminate the fourth edge; and
  determining a new response value for the new edge based at least in part on a first order response value corresponding to the fourth edge.

* * * * *